United States Patent
O'Dell et al.

(10) Patent No.: US 9,714,731 B2
(45) Date of Patent: Jul. 25, 2017

(54) THREADED CONNECTOR LOCKING DEVICE

(71) Applicant: Vetco Gray Inc., Houston, TX (US)

(72) Inventors: Kevin E. O'Dell, Katy, TX (US); Thomas L. Steen, The Woodlands, TX (US); Joseph W. Pallini, Tomball, TX (US); Stephen D. Peters, Houston, TX (US); William R. Patterson, Jr., Houston, TX (US)

(73) Assignee: Vetco Gray Inc., Houston, TX (US)

( * ) Notice: Subject to any disclaimer, the term of this patent is extended or adjusted under 35 U.S.C. 154(b) by 527 days.

(21) Appl. No.: 13/919,687

(22) Filed: Jun. 17, 2013

(65) Prior Publication Data

US 2014/0103640 A1    Apr. 17, 2014

Related U.S. Application Data

(60) Provisional application No. 61/713,387, filed on Oct. 12, 2012.

(51) Int. Cl.
 *F16L 15/08* (2006.01)
 *E21B 17/046* (2006.01)
 *E21B 17/043* (2006.01)

(52) U.S. Cl.
 CPC ............ *F16L 15/08* (2013.01); *E21B 17/043* (2013.01); *E21B 17/046* (2013.01)

(58) Field of Classification Search
 CPC .... E21B 17/043; E21B 17/042; E21B 17/046; F16L 15/08
 USPC .............................................. 285/90, 91, 330
 See application file for complete search history.

(56) References Cited

U.S. PATENT DOCUMENTS

| 477,596 | A |   | 6/1892 | Jones |   |
|---|---|---|---|---|---|
| 1,534,916 | A | * | 4/1925 | Campbell | E21B 17/043 |
|   |   |   |   |   | 16/DIG. 37 |
| 1,681,699 | A | * | 8/1928 | Coates | E21B 17/043 |
|   |   |   |   |   | 279/100 |
| 3,948,545 | A | * | 4/1976 | Bonds | E21B 17/085 |
|   |   |   |   |   | 285/39 |

(Continued)

FOREIGN PATENT DOCUMENTS

| GB | 2112892 A | 7/1983 |
|---|---|---|
| GB | 2148439 A | 5/1985 |

OTHER PUBLICATIONS

PCT Search Report and Written Opinion dated Jan. 8, 2014, issued in connection with corresponding WO Application No. PCT/US2013/064065.

*Primary Examiner* — Gregory Binda
*Assistant Examiner* — Zachary Dragicevich
(74) *Attorney, Agent, or Firm* — Hogan Lovells US LLP

(57) ABSTRACT

A system for joining pipe segments, the system including a first pipe connector connected to a first pipe segment, and a second pipe connector threadingly connectable to the first pipe connector, and connected to a second pipe segment. The system further includes a recess in the outer surface of the first pipe connector, and an elongated key having first and second lengthwise surfaces. One of the lengthwise surfaces has protrusions that embed into a transverse surface of the second pipe connector when the key is mounted into the recess. The thickness of the key decreases with distance radially inward from the outer surface.

18 Claims, 7 Drawing Sheets

(56) References Cited

U.S. PATENT DOCUMENTS

| | | | |
|---|---|---|---|
| 4,538,838 A * | 9/1985 | Pringle | E21B 17/025 285/403 |
| 4,601,491 A * | 7/1986 | Bell, Jr. | E21B 17/043 285/24 |
| 4,757,593 A | 7/1988 | Pallini | |
| 4,900,066 A | 2/1990 | Brammer | |
| 4,902,047 A | 2/1990 | Marietta | |
| 5,044,676 A | 9/1991 | Burton | |
| 7,146,704 B2 | 12/2006 | Otten | |

* cited by examiner

THREADED CONNECTOR LOCKING DEVICE

BACKGROUND OF THE INVENTION

1. Field of the Invention

This technology relates to oil and gas wells, and in particular to pipe connectors within the wells.

2. Brief Description of Related Art

Typical oil and gas wells include strings of pipe that extend into the well in conjunction with drilling, casing, and production operations. These strings of pipe generally consist of discrete pipe segments that are joined together by pipe connectors as the pipe is run into the well. The pipe connectors may be threaded, with adjacent connectors having male and female threads configured to engage and join the pipe. Generally, the pipe end having the male thread is known as the pin, and the pipe end having the female thread is known as the box. When joining the pipe segments, it is desirable to limit circumferential movement between the connectors so that the connectors remain firmly attached. To limit such circumferential movement, a lock key may be employed.

Some known lock keys require corresponding grooves in the pin and the box that align when the pin and the box are threaded together. The key is then inserted into the aligned grooves to prevent relative circumferential movement between the pin and the box. However, many pipe connectors that are threaded together cannot be repeatedly assembled to the same relative angle to each other due to manufacturing variations in the thread, as well as changes to the thread of connectors previously used under load. This is because the pipe connectors must be fully torqued to ensure that the joint properly seals, regardless of the relative positions of the locking grooves on the pin and box.

Additionally, some threaded connectors have small overall wall thickness (e.g., subsea drill pipe and casing), thereby requiring a key that is low profile. Furthermore, under some circumstances there is not enough space surrounding the pipe connectors to incorporate large external mechanisms to drive locking pins or keys into place, as required for many types of locking keys.

SUMMARY OF THE INVENTION

Disclosed herein is a system for locking adjacent pipe connectors. In an example, the system includes a first pipe connector, or box, a second pipe connector, or pin, and a locking key. The first and second pipe connectors have male and female connecting ends, and are configured to thread together. Either the first pipe connector or the second pipe connector has a recess in its connecting end, and the locking key is inserted into the recess to prevent further relative circumferential movement between the first and second pipe connectors.

In this example, the key includes inner and outer surfaces. When the key is inserted into the recess, the inner surface is positioned radially inward, and the outer surface is positioned radially outward relative to the pipe connectors. The key also includes upper and lower surfaces. The upper surface and the lower surface extend from the inner surface to the outer surface. The key also includes locking protrusions positioned on at least the lower surface. In some embodiments, these locking protrusions are ridges that are pressed into, and become embedded in the first or second pipe connectors when the key is inserted into the recess. In other embodiments, some of the locking protrusions may be splines that correspond to notches or grooves in the first or second pipe connectors and are received by the notches when the key is inserted. In either instance, the locking protrusions prevent relative circumferential movement of the pipe connectors.

Also disclosed herein is a method of locking adjacent threaded pipe connectors to prevent relative rotational movement between the pipe connectors. The pipe connectors have threaded male and female connecting ends. In addition, the end of one of the pipe connectors has a recess. According to the method, the pipe connectors are first threaded together. Then, a key is radially inserted into the recess. The key has locking protrusions, as described above, to prevent relative circumferential movement of the pipe connectors.

BRIEF DESCRIPTION OF THE DRAWINGS

The present technology will be better understood on reading the following detailed description of nonlimiting embodiments thereof, and on examining the accompanying drawings, in which.

DETAILED DESCRIPTION OF THE PREFERRED EMBODIMENT

Figure 1:
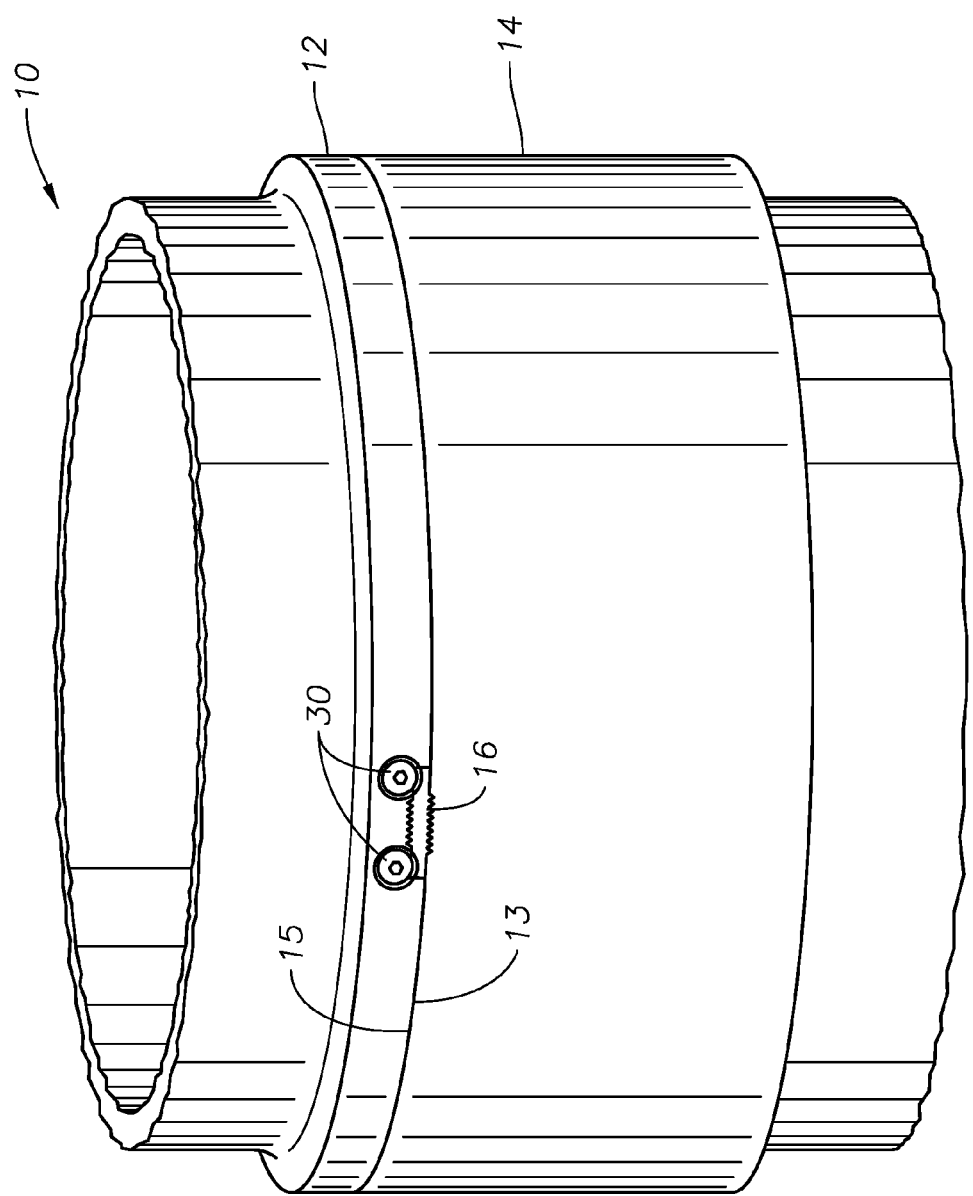
FIG. 1 is a perspective view of a pipe connector locking system having a key according to an example embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

FIG. 1 is a perspective view of one example of a pipe connector locking system 10 according to the present technology, including a first pipe connector 12, a second pipe connector 14, and a key 16. The first and second pipe connectors 12, 14 are configured to engage one another and become attached. For example, the first pipe connector 12 may be a male pipe connector, or pin, having external threads (not shown), and the second pipe connector 14 may be a female pipe connector, or box, having internal threads (not shown). In such an embodiment, the first pipe connector 12 may engage the second pipe connector 14 by connecting the threaded end of the first pipe connector 12 with the threaded end of the second pipe connector 14, and rotating the pipe connectors 12, 14 relative to one another until the threads are engaged. When the threads are fully engaged, an external annular shoulder 13 of first pipe connector 12 abuts an external annular shoulder 15 of second pipe connector. With the threads engaged, and the pipe connectors 12, 14 attached, the key 16 may be inserted between shoulders 13, 15 of the first and second pipe connectors 12, 14 to limit or substantially prevent relative circumferential movement between the pipe connectors 12, 14. In this embodiment, the key 16 may include a material that is harder than the material of first and second pipe connectors 12, 14.

The structure and function of the key 16 is shown in detail in FIGS. 2A-2D. For example, the key 16 has an inner surface 18 (best shown in FIGS. 2C and 2D), and an outer surface 20. The inner surface 18 may be configured so that, upon insertion between the first and second pipe connectors 12, 14, it is positioned radially inward from the outer surface 20. The key 16 also has an upper surface 22 and a lower surface 24 (best shown in FIGS. 2C and 2D). In some embodiments, the upper surface 22 may be tapered axially upward relative to the pipe connectors 12, 14 from the inner surface 18 to the outer surface 20. Similarly, the lower surface 24 may be tapered axially downward relative to the pipe connectors 12, 14. Thus, the thickness the distance between upper and lower surfaces 22, 24) increases with distance from the inner surface 18. In the embodiment of FIGS. 2A-2D, the key 16 include locking ridges 26 protruding therefrom and extending radially from the inner surface 18 to the outer surface 20 of the key 16. Locking ridges 26 each have a generally triangular cross-section with opposing lateral sides that depend towards one another and join a distance from the main body to form a peak. In an example, the key 16 is an elongate member and is set lengthwise along a portion of a circumference of an interface between the first and second connectors 12, 14.

Figure 2A:
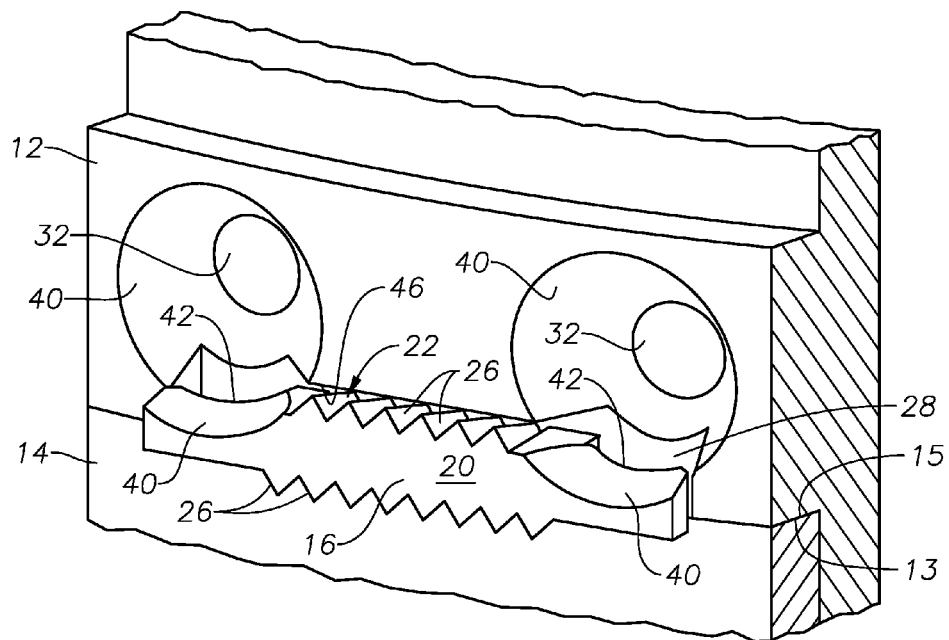
FIG. 2A is an enlarged sectional view of a portion of the connector locking system of FIG. 1, with a key disengaged from pipe connectors.
Figure 2B:
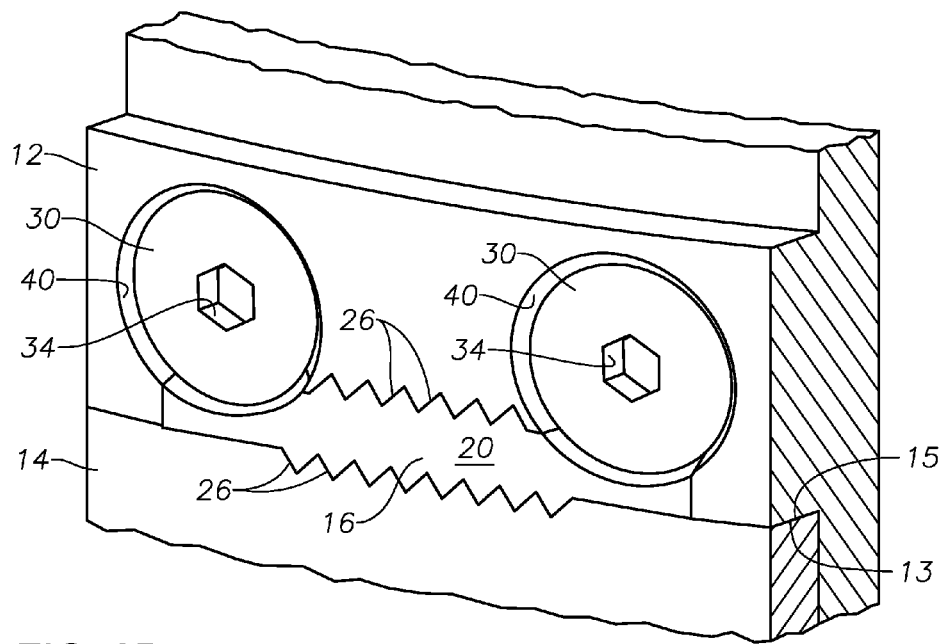
FIG. 2B is an enlarged sectional view of a portion of the connector locking system of FIG. 1, with a key inserted between pipe connectors.
Figure 2C:
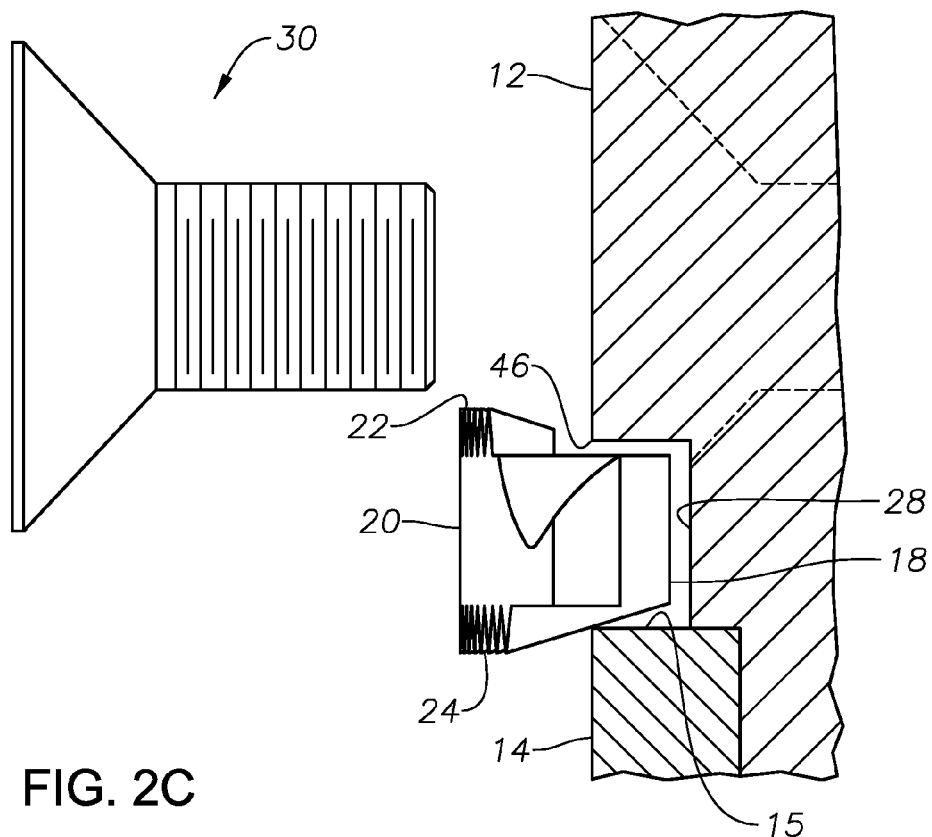
FIG. 2C is an enlarged sectional side view of a portion of the connector locking system of FIG. 1, with a key disengaged from pipe connectors.
Figure 2D:
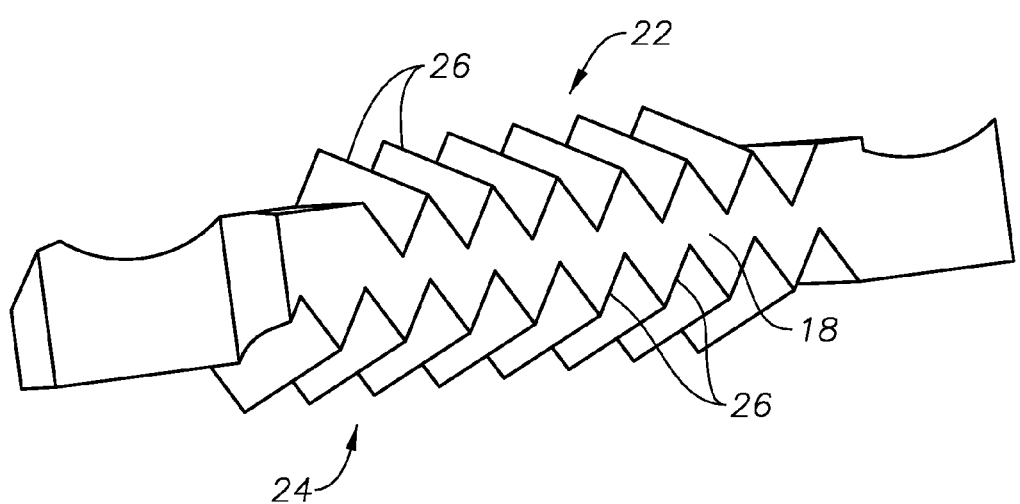
FIG. 2D is a perspective view of the key according to one embodiment of the present technology.

FIGS. 2A and 2C further show a recess 28 in shoulder 13 of the first pipe connector 12. The recess 28 has outer edges 46. Although the recess 28 is shown in the first pipe connector 12, it may alternately be located in the second pipe connector 14. As best shown in FIG. 2C, the height of the recess 28 is greater than or equal to the height of the inner surface 18 of the key 16, but smaller than the height of the outer surface 20 of the key 16. Thus, when the key 16 is inserted into the recess, the inner surface 18 of the key 16 initially enters the recess, but the locking ridges 26 on the tapered upper and lower surfaces 22, 24 of the key 16 contact the edge 46 of the recess 28 and the outer surface of the adjacent pipe connector, and resist further entry of the key 16 into the recess 28. The position of the recess 28 entirely in one pipe connector is advantageous because it allows use of the key 16 regardless of the relative circumferential positions of the pipe connectors when they are fully joined, thereby allowing for clocking independence.

To complete insertion of the key 16 into the recess 28, an external force may be applied to the outer surface 20 of the key 16. For example, the key 16 may be pressed into the recess 28 using a press tool, or hammered in with hand tools. Because the material of the key 16 is harder than the material of the first and second pipe connectors 12, 14, the locking ridges 26 become embedded in shoulders 13, 15 of the first and second pipe connectors 12, 14 as the key 16 is driven into the recess 28. Thus, when fully inserted, the ridges 26 of the key are engaged with, and may be embedded in, the first and second pipe connectors 12, 14, as shown in FIG. 2B. Thus embedded, the locking ridges 26 prevent relative rotational movement between the first and second pipe connectors 12, 14. Furthermore, the key 16 will act bi-directionally, preventing both over-tightening and un-tightening of the pipe connectors 12, 14.

In an alternate embodiment, a portion of the outer edge 46 of the recess 28 may have pre-cut grooves (not shown) configured to accept some of the locking ridges 26. In such an embodiment, the number of locking ridges 26 that become embedded in the first or second pipe connectors 12, 14 would be reduced, thereby reducing the amount of force required to press the key 16 into the recess 28. The key 16 may be removed using a specialty tool or hand tools, for example, by inserting a screw driver or pry bar into a notched area 42 at either end of the key 16. The ability to insert and remove the key 16 using hand tools or other small tools is advantageous because it allows use of the key 16 in circumstances where there is little space surrounding the pipe connectors 12, 14, a circumstance that tends to limit or prevent the use of large external pressing mechanisms or removal tools.

Referring to FIG. 2B, there are shown optional fasteners 30 that may be inserted into the surface of the first pipe connector 12. The fasteners may be, for example, screws or bolts, each with threaded elongate shafts and a larger diameter head attached to an end of the shaft. The fasteners 30 are positioned so that a portion of the head of each fastener 30 overlaps a portion of the key 16. Thus, the fasteners 30 may help to secure the key 16 radially relative to the pipe connectors 12, 14, thereby preventing the key 16 from backing out due to, for example, vibrations, or torsional loads. In the embodiments shown, the fasteners are inserted into holes 32 (shown in FIG. 2A) in the first pipe connector 12. Use of screws or other fasteners may be beneficial to prevent debris from entering removal notch areas 42. In addition, the fasteners may double as anchors for attaching a press tool (for pressing the key 16 into the recess) using external bolts or screws.

Optionally, the fasteners 30 may be countersunk, so that the heads of the fasteners 30 do not protrude beyond the surface of the first pipe connector 12 when the fasteners 30 are fully inserted into the holes 32. Thus, a countersink 40 may be drilled or otherwise bored into the surface of the first pipe connector 12 and a portion of the key 16, In certain embodiments, the heads of the fasteners 30 may be configured to accept a fastener insertion tool, such as, for example, a screwdriver, or a hexagonal alien wrench. For example, the fasteners 30 of the present technology are shown to have hexagonal sockets 34 for accepting such an alien wrench. In an embodiment where the recess 28 is in the second pipe connector 14, the fasteners 30 may correspondingly be inserted into the second pipe connector 14, rather than the first pipe connector 12. In such an embodiment, the holes 32 and countersinks 40 would also be drilled into the second pipe connector 14. Although the fasteners shown in FIG. 2B are bolts, any appropriate mechanism may be used to retain the key 16 radially in place relative to the first and second pipe connectors 12, 14. For example, the key 16 could be retained using flexible tabs, clips, spring mechanisms, or any other appropriate mechanism. In addition, any number of fasteners or retaining mechanisms could be used, including a single fastener or retaining mechanism.

Figure 3A:
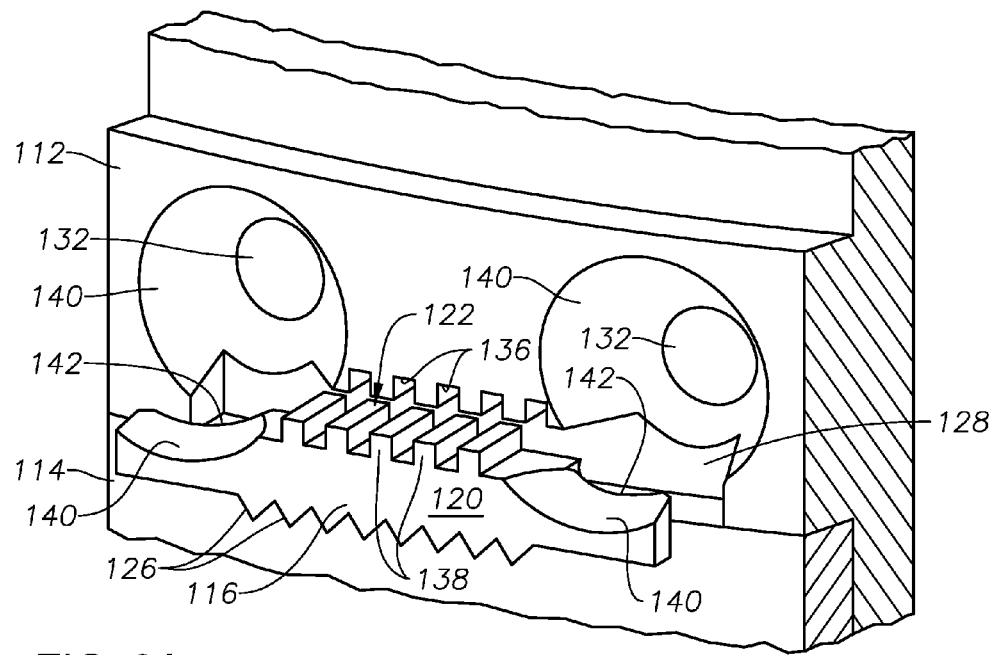
FIG. 3A is an enlarged sectional view of a portion of the connector locking system according to another embodiment of the present technology, with the key disengaged from the pipe connectors.
Figure 3B:
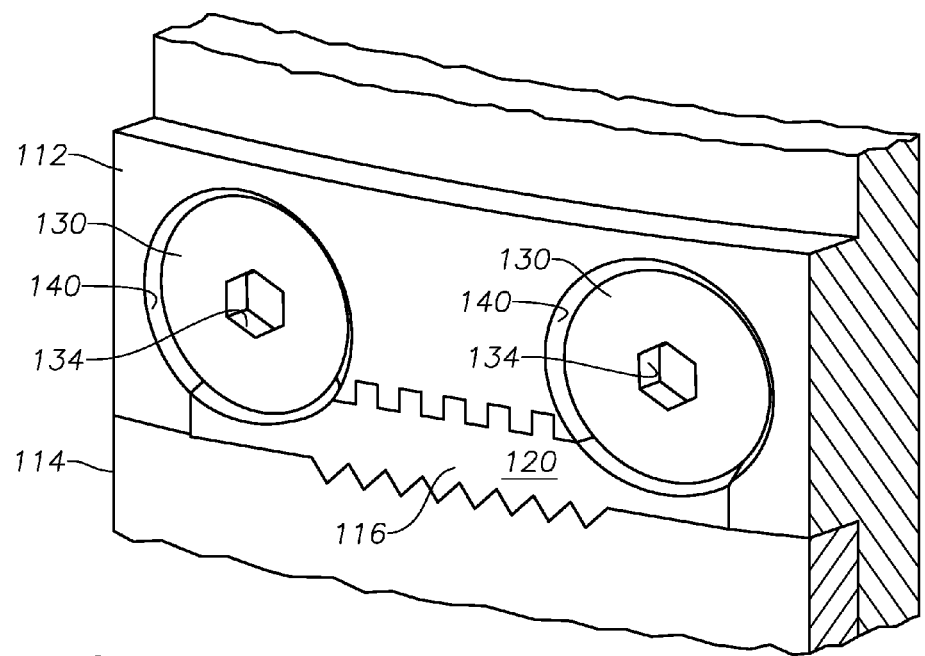
FIG. 3B is an enlarged sectional view of a portion of the connector locking system of FIG. 3A, with the key inserted between the pipe connectors.
Figure 3C:
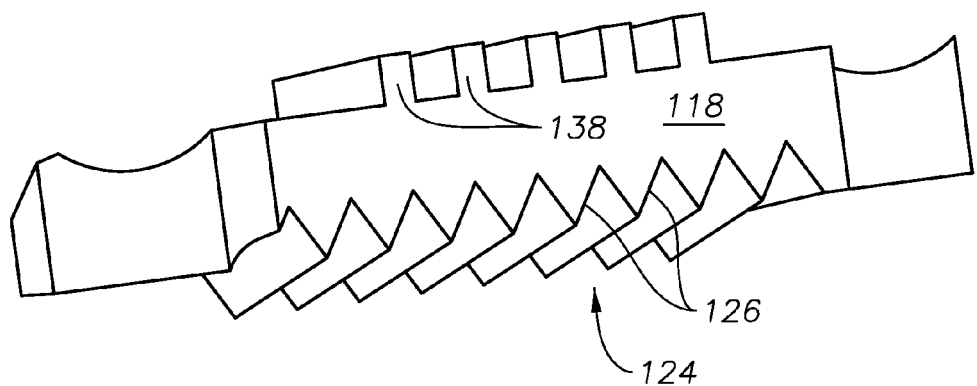
FIG. 3C is a perspective view of a key according to an alternate embodiment of the present technology.

Referring now to FIGS. 3A-3C, there is shown an alternate embodiment of the present technology, including a first pipe connector 112, a second pipe connector 114, and a key 116. The key 116 has an inner surface 118, an outer surface 120, an upper surface 122, and a tapered lower surface 124. The inner surface 118 may be configured so that, upon insertion between the first and second pipe connectors 112, 114, it is positioned radially inward relative to outer surface 120. Conversely, the outer surface 120 may be configured so that, upon insertion between the first and second pipe connectors 112, 114, it is positioned radially outward from inner surface 110. The lower surface 124 may be tapered axially downward relative to the pipe connectors 112, 114. In addition, the key 116 includes locking ridges 126 protruding from the lower surface 124 and extending radially from the inner surface 118 to the outer surface 120. Furthermore, in the embodiment of FIGS. 3A-3C, the first pipe connector 112 has a recess 128 configured to at least partially accept the key 116, and holes 132 for accepting fasteners 130. The recess 128 has notches 136 in the upper surface thereof which may be pre-machined into the pipe connector. Notches 136 extend radially into connector 112 and have generally rectangular outer peripheries.

In the embodiment of FIGS. 3A-3C, the upper surface 122 of the key 116 has rectangular splines 138 with rectangular outer peripheries that extend transverse to the elongate side of the key 116, so that when the key 116 is inserted into the recess 128, the rectangular splines 138 are received by the notches 136. The locking ridges 126 of the bottom surface 124 contact, and become embedded into, the second pipe connector 114 when the key 116 is pressed into the recess 128, as described above. A fully inserted key 116, according to this embodiment, is shown in FIG. 3B. Thus configured, with the key 116 fully inserted, the first and second pipe connectors 112, 114 are restrained from rotating relative to one another. One advantage of the key 116, is that it will act bi-directionally, preventing both over-tightening and un-tightening of the pipe connectors 112, 114, The key 116 may be removed using a specialty tool or hand tools, for example, by inserting a screw driver or pry bar into a notched area 142 at either end of the key 116.

It is to be understood that variations of the embodiment shown in FIGS. 3A-3C are also contemplated. For example, the recess 128 could be in the second pipe connector 114 instead of the first pipe connector 112, as shown. Alternately, the rectangular splines 138 could be positioned on the bottom surface 124 of the key, and the locking ridges 126 on the top surface 122. In such an embodiment, the notches 136 of the recess 128 would be cut into the portion of the second pipe connector 114 adjacent to the recess 128.

Referring to FIG. 3B, there are shown optional fasteners 130 that may be inserted into the surface of the first pipe connector 112. The fasteners may be, for example, screws or bolts. The fasteners 130 are positioned so that a portion of the head of each fastener 130 overlaps a portion of the key 116. Thus, the fasteners 130 may help to secure the key 116 radially relative to the pipe connectors 112, 114, thereby preventing the key 116 from backing out due to, for example, vibrations, or torsional loads. In the embodiments shown, the fasteners 130 are inserted into holes 132 (shown in FIG. 3A) in the first pipe connector 112. Use of screws of other fasteners may be beneficial to prevent debris from entering removal notch areas 142. In addition, the fasteners may double as anchors for attaching a press tool (for pressing the key 116 into the recess) using external bolts or screws.

Optionally, the fasteners 130 may be countersunk, so that the heads of the fasteners 130 do not protrude beyond the surface of the first pipe connector 112 when the fasteners 130 are fully inserted into the holes 132. Thus, a countersink 140 may be drilled or otherwise bored into the surface of the first pipe connector 112 and a portion of the key 116. In certain embodiments, the heads of the fasteners 130 may be configured to accept a fastener insertion tool, such as, for example, a screwdriver, or a hexagonal alien wrench. For example, the fasteners 130 of the present technology are shown to have hexagonal sockets 134 for accepting such an alien wrench. In an embodiment where the recess 128 is in the second pipe connector 114, the fasteners 130 would correspondingly be inserted into the second pipe connector 114, rather than the first pipe connector 112. In such an embodiment, the holes 132 and countersinks 140 would also be drilled into the second pipe connector 114. Although the fasteners shown in FIG. 3B are bolts, any appropriate mechanism may be used to retain the key 116 radially in place relative to the first and second pipe connectors 112, 114. For example, the key 116 could be retained using flexible tabs, clips, spring mechanisms, or any other appropriate mechanism. In addition, any number of fasteners or retaining mechanisms could be used, including a single fastener or retaining mechanism.

Referring now to FIGS. 4A-4D, there is shown another embodiment of the present technology, including a first pipe connector 212, a second pipe connector 214, and a key 216. The key 216 has an inner surface 218, an outer surface 220, an upper surface 222, and a tapered lower surface 224. The inner surface 218 may be configured so that, upon insertion between the first and second pipe connectors 212, 214, it is positioned radially inward relative to the pipe connectors 212, 214. Conversely, the outer surface 220 may be configured so that, upon insertion between the first and second pipe connectors 212, 214, it is positioned radially outward relative to the pipe connectors 212, 214. The tower surface 224 may be tapered axially downward relative to the pipe connectors 212, 214. In addition, the key 216 includes locking ridges 226 protruding from the lower surface 224 and extending radially from the inner surface 218 to the outer surface 220, Furthermore, in the embodiment of FIGS. 4A-4D, the first pipe connector 212 has a recess 228 configured to at least partially accept the key 216, and holes 232 for accepting fasteners 230. The recess has grooves 236 in the upper surface thereof which may be pre-machined into the pipe connector.

Figure 4B:
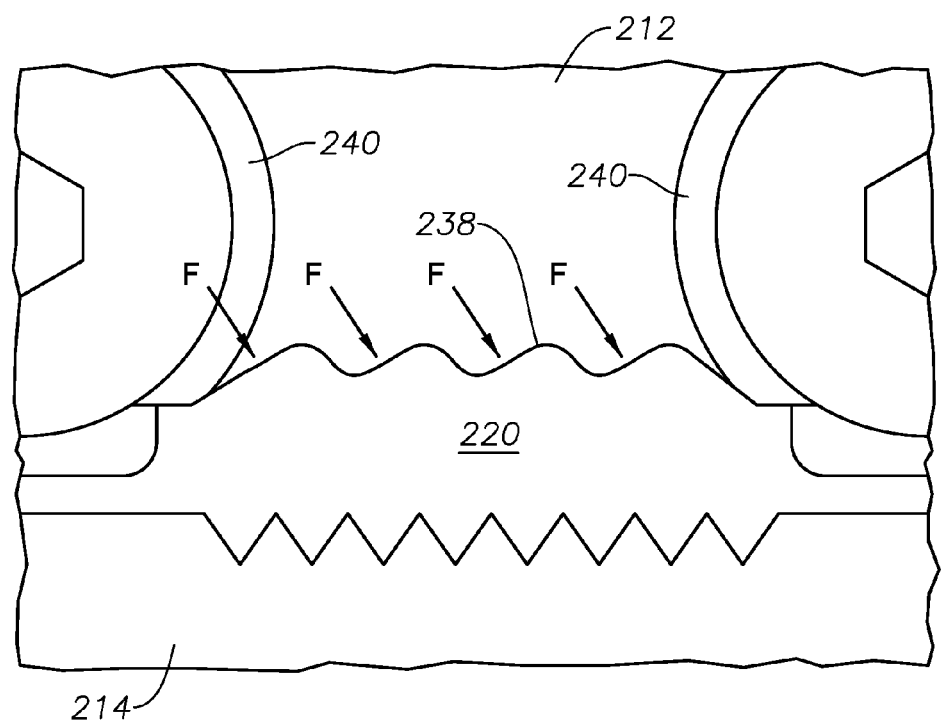
FIG. 4B is an enlarged side view of a portion of the connector locking system of FIG. 4A, with the key inserted between the pipe connectors.

In the embodiment of FIGS. 4A-4D, the upper surface 222 of the key 216 has radially extending splines 238, each with an upper surface that is curved about an axis of each spline 238. Splines 238 are positioned so that when the key 216 is inserted into the recess 228, the curved splines 238 are received by the grooves 236. Splines 238 have ridges shown extending radially from the front surface 220 to the rear surface 218. The locking ridges 226 of the bottom surface 224 contact, and become embedded into, the second pipe connector 214 when the key 216 is pressed into the recess 228, as described above. A fully inserted key 216, according to this embodiment, is shown in FIG. 4B. Thus configured, with the key 216 fully inserted, the first and second pipe connectors 212, 214 are restrained from rotating relative to one another.

Figure 4A:
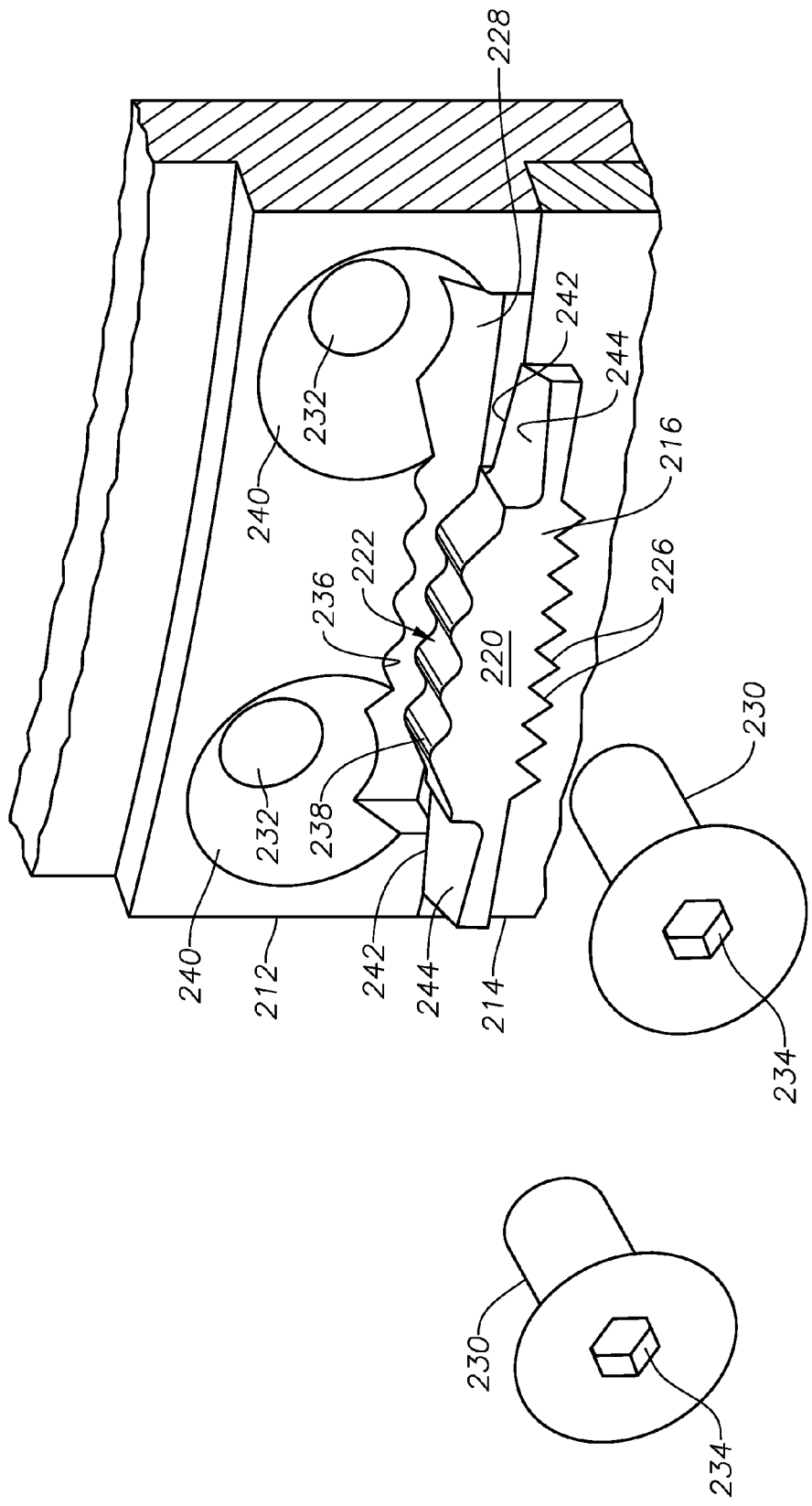
FIG. 4A is an enlarged exploded sectional view of a portion of an alternate embodiment of the connector locking system according to an embodiment of the present technology.
Figure 4C:
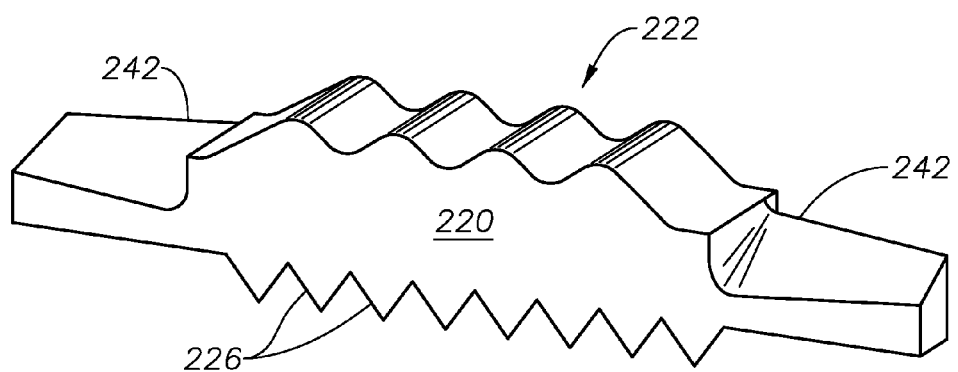
FIG. 4C is an outer perspective view of a key according to an embodiment of the present technology.
Figure 4D:
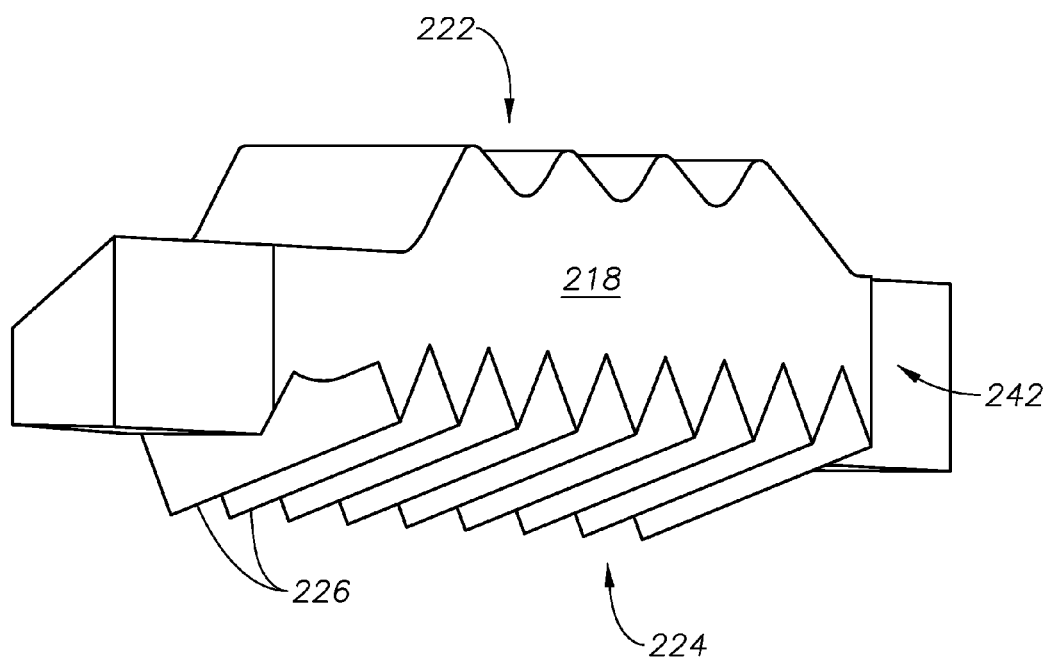
FIG. 4D is an inner perspective view of the key of FIG. 4C.

One advantage to the key 216, is that it will act hi-directionally, preventing both over-tightening and un-tightening of the pipe connectors 212, 214. Moreover, the curved splines 238 can be either symmetric, as shown in FIGS. 4A, 4C, and 4D, or asymmetric, as shown in FIG. 4B. If symmetric, the curved splines 238 will have a substantially equal capacity to prevent relative circumferential rotation of the pipe connectors 212, 214 in both directions. If asymmetric, the curved splines 238 will have additional load bearing capacity in one direction, depending on the orientation of the curved splines 238. Another advantage to the key 216 having curved splines 238, is that as the surfaces of the curved splines absorb the forces F (shown in FIG. 4B) exerted on the key 216 by the first pipe connector 212, the locking ridges 226 are driven deeper into the second pipe connector 214. Accordingly, the ability of the key 216 to prevent relative circumferential rotation between the pipe connectors 21 214 is increased. The key 216 may be removed using a specialty tool or hand tools, for example, by inserting a screw driver or pry bar into a notched area 242 at either end of the key 216.

It is to be understood that variations of the embodiment shown in FIGS. 4A-4D are also contemplated. For example, the recess 128 could be in the second pipe connector 214 instead of the first pipe connector 212, as shown. Alternately, the curved splines 238 could be positioned on the bottom surface 224 of the key, and the locking ridges 226 on the top surface 222. In such an embodiment, the grooves 236 of the recess 228 would be cut into the portion of the second pipe connector 214 adjacent to the recess 228.

Referring to FIG. 4A, there are shown optional fasteners 230 that may be inserted into the surface of the first pipe connector 212. The fasteners may be, for example, screws or bolts. The fasteners 230 are positioned so that a portion of the head of each fastener 230 overlaps a portion of the key 216 when installed in recess 228. Thus, the fasteners 230 may help to secure the key 216 radially relative to the pipe connectors 212, 214, thereby preventing the key 216 from hacking out due to, for example, vibrations, or torsional loads. In the embodiments shown, the fasteners 230 are inserted into holes 232 (shown in FIG. 4A) in the first pipe connector 212. In certain embodiments, the heads of the fasteners 230 may be configured to accept a fastener insertion tool, such as, for example, a screwdriver, or a hexagonal allen wrench. For example, the fasteners 230 of the present technology are shown to have hexagonal sockets 234 for accepting such an alien wrench. Use of screws or other fasteners may be beneficial to prevent debris from entering removal notch areas 242. In addition, the fasteners may double as anchors for attaching a press tool (for pressing the key 216 into the recess) using external bolts or screws.

Optionally, the fasteners 230 may be countersunk, so that the heads of the fasteners 230 do not protrude beyond the surface of the first pipe connector 212 when the fasteners 230 are fully inserted into the holes 232. Thus, a countersink 240 may be drilled or otherwise bored into the surface of the first pipe connector 212 and a portion of the key 216. Alternatively, the key 216 may include a flat retaining surface 244 instead of a curved countersink. Such a flat retaining surface 244 allows the fastener 230 to be recessed relative to the surface of the pipe connector, while at the same time allowing the key 216 to move slightly relative to the second pipe connector 214, thereby increasing drive pressure and capacity of the locking ridges 226.

In an embodiment where the recess 228 is in the second pipe connector 214, the fasteners 230 would correspondingly be inserted into the second pipe connector 214, rather than the first pipe connector 212. In such an embodiment, the holes 232 and countersinks 240 would also be drilled into the second pipe connector 214. Although the fasteners shown in FIG. 4B are bolts, any appropriate mechanism may be used to retain the key 216 radially in place relative to the first and second pipe connectors 212, 214. For example, the key 216 could be retained using flexible tabs, clips, spring mechanisms, or any other appropriate mechanism, In addition, any number of fasteners or retaining mechanisms could be used, including a single fastener or retaining mechanism.

Providing multiple locking ridges 26, 126, 226 or splines 138, 238 on both the upper 22, 122, 222 and lower 24, 124, 224 surfaces of the key 16, 116, 216 is advantageous because such a structure helps to prevent unintentional decoupling of the first 12, 112, 212 and second 14, 114, 214 pipe connectors. Furthermore, such a structure allows the key 16, 116, 216 to be low profile because the bearing and shear areas that transfer the load across the key 16, 116, 216 are distributed across all the locking ridges 26, 126, 226 and/or splines 138, 238. Thus, the key 16, 116, 216 of the present technology is compatible with very low profile connectors.

While the technology has been shown or described in only some of its forms, it should be apparent to those skilled in the art that it is not so limited, but is susceptible to various changes without departing from the scope of the invention. Furthermore, it is to be understood that the above disclosed embodiments are merely illustrative of the principles and applications of the present invention. Accordingly, numerous modifications may be made to the illustrative embodiments and other arrangements may be devised without departing from the spirit and scope of the present invention as defined by the appended claims.

What is claimed is:

1. A system for joining pipe segments, comprising:
    a first pipe connector connected to a first pipe segment;
    a second pipe connector threadingly connectable to the first pipe connector, and connected to a second pipe segment;
    the first and second pipe connectors having a common axis and annular first and second shoulders, respectively, that abut each other when the first and second pipe connectors are connected together;
    a recess in the first shoulder extending radially inward from an outer surface of the first shoulder; and
    an elongated key having first and second lengthwise surfaces, the second lengthwise surface having protrusions that extend radially and embed into and form radial grooves in the second shoulder of the second pipe connector when the key is forced radially inward into the recess, and wherein an axial thickness of the key from the first to the second lengthwise surface decreases with distance radially inward from an outer surface of the key,
    wherein a portion of the first shoulder within the recess has at least one radially extending notch, and the first lengthwise surface of the key has a mating radially extending spline that mates with the notch when the protrusions embed into the second shoulder.

2. The system of claim 1, wherein the key is composed of a material that is harder than the material of the first or second pipe connectors.

3. The system of claim 1, wherein the first lengthwise surface of the key also has protrusions that extend radially, the protrusions of the first lengthwise surface embedding into a portion of the first shoulder within the recess when the key is forced into the recess.

4. The system of claim 1, wherein the protrusions comprise ridges that are triangular in shape in a transverse cross-section, and the spline differs in shape from the ridges in transverse cross-section.

5. The system of claim 4, wherein the spline has a curved profile in a transverse cross-section.

6. The system of claim 4, wherein the spline comprises a plurality of splines having curved surfaces that join each other to define an undulating profile, and the notch comprises a plurality of notches having curved surfaces that mater with the curved surfaces of the splines.

7. The system of claim 1, further comprising:
a threaded fastener attached to the first pipe connector, wherein a portion of the fastener engages the key after the key has been forced into the recess to prevent that key from moving radially outward relative to the first and second pipe connectors.

8. The system of claim 7, wherein the first lengthwise surface of the key has a countersink positioned to receive a portion of a head of the fastener.

9. The system of claim 1, wherein the recess has opposing sidewalls that contact circumferentially spaced apart ends of the key.

10. The system of claim 1, wherein the protrusions comprise ridges, each with a triangular shape in transverse cross-section.

11. The system of claim 1, wherein the recess is bounded by a transverse surface substantially parallel to and axially spaced apart from the second shoulder, and opposing sidewalls that extend from the transverse surface of the recess toward the second shoulder.

12. A system for joining pipe segments, comprising:
a first pipe connector connected to a first pipe segment;
a second pipe connector threadingly connectable to the first pipe connector, and connected to a second pipe segment;
the first and second pipe connectors having a common axis and annual first and second shoulders, respectively, that are in planes perpendicular to the axis and abut each other when the first and second connectors are connected together;
a recess in the first shoulder extending radially inward from an outer surface of the first shoulder, the recess defining a recess transverse surface in the first shoulder that faces toward and is spaced axially from a portion of the second shoulder;
a plurality of radially extending notches in the recess transverse surface;
an elongated key having first and second key lengthwise surfaces, the second key lengthwise surface having protrusions comprising sharp, radially extending ridges that extend radially inward from an outer surface of the key and embed into and form radially extending grooves in the second shoulder when the key is forced radially into the recess, and wherein a thickness of the key decreases with distance radially inward from an outer surface of the key;
a plurality of radially extending splines on the first key lengthwise surface that mate with the notches; and
a fastener attached to the first pipe connector, wherein a portion of the fastener engages the key after the key has been forced into the recess to prevent the key from moving radially outward relative to the first or second pipe connectors.

13. The system of claim 12, wherein one of the key lengthwise surfaces defines a countersink for accepting a portion of a fastener attached to the first pipe connector.

14. The system of claim 12, wherein the protrusions are triangular in cross-section and extend from the outer surface to an inner surface of the key.

15. The system of claim 12, wherein:
the notches have curved surfaces that join each other to define an undulating profile; and
the splines have curved surfaces that mate with the curved surfaces of the notches.

16. The system of claim 12, wherein the recess has opposing sidewalls that extend from the transverse surface of the recess toward the second shoulder.

17. A method of locking adjacent threaded pipe connectors to prevent relative circumferential movement between the pipe connectors, the first and second pipe connectors having a common axis and annular first and second shoulders, respectively, that abut each other when the first and second pipe connectors are connected together, the method comprising:
providing a recess in the first shoulder extending radially inward from an outer surface of the first shoulder, wherein a portion of the first shoulder within the recess has at least one radially extending notch;
providing an elongated key having first and second lengthwise surfaces, the second lengthwise surface having protrusions that extend radially, and the first lengthwise surface of the key having a radially extending spline that mates with the notch;
threading the pipe connectors together; and
radially forcing the key into the recess, causing the protrusions to embed into and from radially extending grooves in the second shoulder, so that the protrusions prevent relative circumferential movement between the first and second pipe connectors.

18. The method of claim 17, further comprising:
securing a threaded fastener to the first pipe connector such that a portion of the threaded fastener engages the key after the key has been forced into the recess to prevent the key from moving radially outward relative to the first and second pipe connectors.

\* \* \* \* \*